(12) United States Patent
Graham et al.

(10) Patent No.: US 8,347,375 B2
(45) Date of Patent: Jan. 1, 2013

(54) SYSTEM AND METHOD FOR DYNAMIC DISTRIBUTION OF INTRUSION SIGNATURES

(75) Inventors: Richard W. Graham, Derry, NH (US); John J. Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 706 days.

(21) Appl. No.: 10/956,304

(22) Filed: Oct. 1, 2004

(65) Prior Publication Data

US 2005/0076245 A1 Apr. 7, 2005

Related U.S. Application Data

(60) Provisional application No. 60/508,428, filed on Oct. 3, 2003.

(51) Int. Cl.
*G06F 9/00* (2006.01)
*G06F 15/16* (2006.01)
*G06F 17/00* (2006.01)

(52) U.S. Cl. ............ 726/13; 726/3; 726/4; 726/11; 726/12; 726/16; 726/23; 726/24; 726/25; 726/29; 713/153; 713/155; 713/168; 709/201; 709/221; 717/126; 717/155; 717/168; 717/172; 717/173; 717/178

(58) Field of Classification Search .................. 709/224, 709/204; 713/201, 172; 726/23
See application file for complete search history.

(56) References Cited

U.S. PATENT DOCUMENTS

| 5,452,442 | A | 9/1995 | Kephart |
|---|---|---|---|
| 5,485,575 | A  * | 1/1996 | Chess et al. |
| 6,279,113 | B1 * | 8/2001 | Vaidya ............................ 726/23 |
| 6,321,338 | B1 * | 11/2001 | Porras et al. .................... 726/25 |
| 6,484,315 | B1 * | 11/2002 | Ziese ............................ 717/173 |
| 6,981,146 | B1 * | 12/2005 | Sheymov ....................... 713/172 |
| 7,089,428 | B2 * | 8/2006 | Farley et al. .................... 726/22 |
| 7,418,733 | B2 | 8/2008 | Connary et al. |
| 2003/0009699 | A1 | 1/2003 | Gupta et al. |
| 2003/0014662 | A1 | 1/2003 | Gupta et al. |

(Continued)

FOREIGN PATENT DOCUMENTS

WO    WO 9957625 A1 * 11/1999

OTHER PUBLICATIONS

Kashiwa, D et al., Active Shaping: A Countermeasure Against DDoS Attacks; European Conference on Universal Multiservice Networks, ECUMN, XP-002998979, Apr. 8, 2002, pp. 171-179.

(Continued)

*Primary Examiner* — Nathan Flynn
*Assistant Examiner* — Bryan Wright
(74) *Attorney, Agent, or Firm* — Verrill Dana, LLP; Chris A. Caseiro (57) ABSTRACT

The intrusion detection function monitors for and reports detected intrusion signatures. The dynamic intrusion signatures function determines whether reported intrusion signatures exist in a library of signatures associated with a particular intrusion detection function. If the reported signature does not exist in the library, the library is updated. Detected intrusion signatures are reported to similarly enabled devices for library analysis and updating, if necessary. The related method includes the steps of monitoring for intrusion signatures or other triggering events, analyzing the events and updating IDS signature libraries as necessary.

44 Claims, 6 Drawing Sheets

U.S. PATENT DOCUMENTS

| | | |
|---|---|---|
| 2003/0014665 A1* | 1/2003 | Anderson et al. ............ 713/201 |
| 2003/0051026 A1* | 3/2003 | Carter et al. ................. 709/224 |
| 2003/0065793 A1 | 4/2003 | Kouznetsov et al. |
| 2003/0074581 A1 | 4/2003 | Hursey et al. |
| 2003/0074582 A1* | 4/2003 | Patel et al. .................... 713/201 |
| 2003/0110393 A1 | 6/2003 | Brock et al. |
| 2003/0188189 A1 | 10/2003 | Desai et al. |
| 2004/0111637 A1* | 6/2004 | Baffes et al. ................. 713/201 |
| 2004/0215972 A1* | 10/2004 | Sung et al. ................... 713/201 |
| 2004/0255163 A1 | 12/2004 | Swimmer et al. |
| 2005/0044406 A1* | 2/2005 | Stute ............................. 713/201 |
| 2005/0050353 A1 | 3/2005 | Thiele et al. |

OTHER PUBLICATIONS

Chen, E. Y., AEGIS: An Active-Network-Powered Defense Mechanism Against DDoS Attacks, Proceeding of IWAN 2001, LNCS 2207, Oct. 2001, pp. 1-15, Springer-Verlag, Berlin DE.

* cited by examiner

FIG. 1

Network Infrastructure Device

SYSTEM AND METHOD FOR DYNAMIC DISTRIBUTION OF INTRUSION SIGNATURES

CROSS REFERENCE TO RELATED APPLICATION

This application claims the priority benefit of provisional U.S. application Ser. No. 60/508,428, filed Oct. 3, 2003, of the same title, by the same inventors and assigned to a common owner. The contents of that priority application are incorporated herein by reference.

BACKGROUND OF THE INVENTION

1. Field of the Invention

The present invention relates to systems and methods for improving intrusion detection capabilities of an Intrusion Detection System (IDS) associated with a network system. More particularly, the present invention relates to a system and related method for rapid, dynamic deployment of intrusion detection signatures and capabilities to devices of the network system infrastructure having IDS function capability or limited IDS function capability.

2. Description of the Prior Art

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network. A network permits communication or signal exchange among the various computing systems of a common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

Presently, access to applications, files, databases, programs, and other capabilities associated with the entirety of a discrete network is restricted primarily based on the identity of the user and/or the network attached function. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication of the offered attached function identity, that attached function may access network services at the level permitted for that identification. For purposes of the present description, "network services" include, but are not limited to, access, Quality of Service (QoS), bandwidth, priority, computer programs, applications, databases, files, and network and server control systems that attached functions may use or manipulate for the purpose of conducting the business of the enterprise employing the network as an enterprise asset. The basis upon which the network administrator grants particular permissions to particular attached functions in combination with the permissions is an established network usage policy.

Events and activities do occur that may be harmful to the network system. For purposes of this description, harm to the network system includes, for example, denying access to the network, denying access to the service once permitted access to the network, intentionally tying up network computing resources, intentionally forcing bandwidth availability reduction, and restricting, denying or modifying network-related information. There are currently two generally available forms of network protection designed to minimize such types of network harm: firewalls and IDSs. Firewalls monitor, analyze and enforce all in one, and are designed to prevent the passage of packets to the network based on certain limited specific conditions associated with the packets. Firewalls do not permit packet passage for the purpose of further analysis nor do they enable assigned policy modifications.

IDSs only monitor traffic. They do not analyze nor do they enforce. They are generally more effective at monitoring/detecting potentially harmful traffic than are firewalls. They are designed to observe the packets, the state of the packets, and patterns of usage of the packets entering or within the network infrastructure for harmful behavior. For the most part, existing IDSs, whether network-based (NIDS), host-based (HIDS) or a combination of the two (NIDS/HIDS), report possible intrusions to a centralized application for further analysis. That is, all detected potentially harmful occurrences are transferred to a central processing function for analysis and, if applicable, alarm reporting. The detection functionality may reside in one or more appliances associated with one or more network entry devices. Each appliance provides its own report to the central processing function with respect only to those packets passing through it. The central processing function then conducts the analysis and the alarm reporting. Network administrators often restrict the intrusion detection functionality to certain parts or entry ports of the network system rather than to the entirety of the system. That is, for example, all packets entering a network infrastructure from an attached function may be forced to enter through one or more select entry functions. Those functions may be specific devices and/or specific ports of one or more devices.

Upon receipt of an alarm, the network administrator can either do nothing, or implement a response function through adjustment of the operation of one or more network infrastructure devices. The implementation of a response function may take a relatively significant amount of time, with the response delay, or latency, potentially allowing greater harm to, or at least reduced effectiveness of, the network system prior to the implementation of a function to address the triggering activity or event. Further, the entry functions are chosen for throughput capacity, but generally do not have the monitoring capability on all ports, particularly given the intensive processing capacity generally required for packet analysis. That restricted deployment forces the network administrator to balance network security with full use of the network infrastructure capacity.

The IDS operates by monitoring network signal traffic for deviations from normal expected activities. Deviations are identified by comparing monitored traffic with known acceptable traffic patterns. At the most detailed level, the monitoring involves examining each bit of traffic and evaluating strings of bits for patterns. At an intermediate level, signal exchange formats, or packaging protocols are examined for deviations from known expected protocol formats. At the highest level and minimal detail, anomalies in overall traffic patterns are monitored, such as substantial changes in activity at a particular port of a particular network infrastructure device. The present invention is directed to the most granular level of evaluation, that of pattern matching.

Pattern matching involves provisioning on one or more network infrastructure devices with known "signatures" of potentially harmful packets or sets of packets. For the purpose of this invention, a signature is a known pattern of bits representative of a message, file, or program designed to establish unauthorized access to network services or to modify the configuration of one or more network infrastructure devices or other harmful network activity. The signature may be generated by an attached function or by a device forming part of the network infrastructure or sets of each or both. Algorithms are used to compare signal patterns with known signatures. If a match is identified, the network administrator is notified with information about the detected signature event. Upon receipt of notification, the network administrator may do nothing or manually adjust the state of the entire network infrastructure or a particular network infrastructure device in response to the detected signature.

The process of examining packets bit by bit to detect known harmful signatures provides the most effective network security in most instances, but it can also slow the network's operation. One way to balance network efficiency and network security involves moving away from a purely centralized signature analysis function to a distributed model of IDS functionality. Specifically, one or more network entry or distribution devices located at or near the edge of the network infrastructure may be provisioned with a portion of the total number of known IDS signatures, while one or more network infrastructure devices closer to the core of the network may include all or a larger portion of the total number of known signatures. In that way, a provisioned network entry device may be able to detect a known signature more quickly for reporting to the network administrator.

Signal patterns that the network entry device does not detect in the pattern matching evaluation are, in theory, picked up by other devices having larger signature sets for match evaluation. Unfortunately, the number of known harmful signature patterns changes almost daily and it is difficult to add them to the network entry devices without compromising the primary function of such devices—to pass packets as accurately and as quickly as possible. On the other hand, the IDS may be less effective as isolated network entry devices may be targeted with harmful signatures they cannot detect and an effective attack on the entire network system may materialize before the centralized pattern matching function fully recognizes the signature(s) involved.

Therefore, what is needed is an improved IDS with an effective mechanism for provisioning network infrastructure devices with known attack signatures as quickly as possible with minimal detrimental impact on the primary operation of those devices. Further, what is needed is an improved IDS with an effective mechanism for detecting potentially harmful attacks without requiring substantial introduction of intrusion detection appliances layered on the network infrastructure devices designed to transfer signals. Yet further, what is needed is such an improved IDS that may be configured to respond quickly and effectively to known and new intrusion signatures without a complete and substantial adjustment to existing network infrastructure devices.

SUMMARY OF THE INVENTION

The present invention is a system and related method for distributing intrusion signatures to all devices forming part of the intrusion reporting system of an IDS. In particular, the present invention is a system and method in which all network infrastructure devices having intrusion detection functionality are provisioned with intrusion signatures. Each such infrastructure device includes a set of intrusion signatures that may not be exactly the same as the signature sets of the other infrastructure devices. Some of the devices may have more signatures in the set than others. The devices including the intrusion detection functionality may be stand-alone NIDS, network entry switches with some NIDS functionality, core network switching devices with some NIDS functionality, and routers and gateways with NIDS functionality. A network infrastructure device may also include a portion of the functionality associated with the present invention. Further, the functions to be described herein may be embodied in a single device, in a central device, in an edge device, in a centralized manner or in a distributed manner including a plurality of network infrastructure devices. An analysis function of the system uses network information, including detected intrusion signatures, location information, packet information, and/or other information of interest to the network administrator to optimize detection capability and minimize forwarding impact on network system traffic.

In general, the present invention provides for the dynamic transfer of intrusion signatures among IDS functions of the network system. The analysis function includes one or more algorithms employed to determine which intrusion signatures are to be transferred to which IDS functions, including to all IDS functions, or a portion thereof. The analysis function improves network system IDS detection in response to triggering conditions that may include, but are not limited to, harmful network intrusions coming from attached functions, network infrastructure entry devices, other network infrastructure devices, such as central forwarding devices and servers, as well as affected agents and functions of the network system. The triggering condition may also be something other than a reactive mechanism associated with a detected intrusion or other type of network anomaly. Instead, it may be a timed, administered, or otherwise planned condition. For the purpose of this description, any such condition is considered to be a distribution triggering condition. It is to be noted that the present invention contemplates that all known intrusion signatures may be contained in a single library, or they may be distributed among a plurality of IDS libraries. For the purpose of this description, an intrusion signature is any signal pattern that may be considered harmful to the network system.

The analysis function of the present invention may be embodied in one or more network infrastructure devices as described herein, but is preferably embodied in a server function. The analysis function includes access to a library of intrusion signatures, and one or more algorithms established to distribute one or more of the stored intrusion signatures to one or more IDS functions, preferably in a manner that optimizes intrusion detection coverage for the network system. Specifically, for example, upon learning of the detection of an intrusion signature, one or more algorithms of the analysis function may initiate instructions for adjustment of IDS function coverage among one or more IDS functions to prioritize detection of the origin of the reported intrusion signature, such as by updating one or more libraries of one or more IDS function to monitor for the particular detected intrusion signature.

It is to be understood that a library associated with an IDS function may have as few as no signatures, with the library being populated by the analysis function as required. The signatures may be cached or stored as non-operational signatures that are only loaded as operational ones to be monitored upon instruction from the analysis function. The IDS function may be configured to contain a portion of, or all known intrusion signatures, but only monitor for a subset or none thereof except when specifically instructed to do so by the analysis function. Further, the IDS function may operate on a part-time basis or not at all except as called upon to do so by the analysis function. For example, a network infrastructure device function that otherwise or ordinarily operates regularly as a classification or packet forwarding device may be enabled, when instructed, to perform as an IDS, either in conjunction with continued classification/forwarding functionality or instead of that functionality. In that situation, the network infrastructure device may be employed to pinpoint the specific source of a suspected intrusion signature. Relatedly, the network infrastructure device may be configured to direct none, a portion, or all of its processing capability to a reported intrusion signature(s) based upon the relevant threat that that signature(s) imposes to the network system. For example, an intrusion signature that would cause complete failure of a portion or all of the network system may get complete IDS functionality attention, while a signature deemed to be a nuisance but not fatally harmful may get low priority attention.

The IDS function described herein may exist in a standalone device, as will be the focus of the following description. Alternatively, it may be a software, firmware, hardware, or mix thereof including one or more algorithms, which may be loaded into one or more devices of the network infrastructure, as needed or desired, with a set of one or more operational or "triggerable" signatures provided for the IDS function to monitor. The IDS function and/or the library of signatures may be modified dynamically by the analysis function.

Upon detecting an intrusion signature based upon a match made with a signature pattern in an intrusion signature library, a detecting device reports the existence of the particular intrusion signature. The system is configured to direct that reported information to some or all other network infrastructure devices including IDS functionality, or to provide the information and IDS function as earlier noted, either directly or through a central function, such as a server, with the central function having the ability to analyze the information, determine algorithmically whether to formulate a response and, if so, the form of the response, notify other devices of one or more intrusion signatures to be added to their libraries or otherwise activated, or a combination thereof. As a result, a portion of, or all, other network infrastructure devices including NIDS functionality are prepared to report whether they too are detecting the same intrusion signature and, if appropriately configured, to respond thereto, such as through a change of policy. The dynamic deployment of these signatures, generated automatically rather than through manual initiation after receipt of an alarm, modifies or enhances the IDS function capability at various locations in the network infrastructure. Moreover, the deployment may be made in response to other triggers or conditions from other network infrastructure devices, such as gateways, firewalls, network events and network vulnerability tools.

As noted, the analysis function may be centralized or distributed and preferably includes one or more algorithms configured to determine whether to distribute one or more intrusion signatures and where they are to be distributed. The distribution may be to NIDS function appliances, a centralized or distributed server, other network infrastructure devices including NIDS functionality, either stored, cached, or provided by the analysis function. Algorithms for signature deployment or distribution may be as simple as having each IDS function run for monitoring each identified signature for a specified period of time, moving on to the following ones on the list for the specified period of time. That would provide complete coverage over a period of time dictated by the number of signatures, the time each is to run, and how many can be run in parallel. Other signature algorithms may include: 1) weighting by most recently found signature(s); 2) weighting based on severity of network harm, including consideration of the device and/or network involved; 3) weighting based on least lost performance in the device running the NIDS function and/or the forwarding device associated with the device having the NIDS functionality; 4) simple random signatures; or 5) location, physical or logical.

The analysis function may account for the network topology. For example, certain intrusion signatures may be monitored at or near network entry devices, while others may be monitored for centralized devices, such as the monitoring of network traffic destined for a large server or gateway. It is to be noted that some intrusion signatures provide broad, but less reliable, indications of harm, while others of narrower indication of potential harm may be more reliable indicators. The algorithms may be tailored to account for such differences and where signatures are therefore distributed. The analysis function of the invention may employ these and other techniques, such as algorithms that are based on time, data frequency, network history, IDS function history, network logs, or anomaly information to initiate distribution. The analysis function may also be configured to supply the one or more intrusion signatures to be monitored with a limited set of signatures based on those found by a centralized IDS function as part of an effort to locate the source of the intrusion that initiated the analysis.

As indicated, the system of the present invention is preferably used to determine whether an attack is localized or distributed. That is, with all other intrusion detection functions prepared to detect the particular signature first reported and then added to each library, the network administrator can identify whether any other infrastructure devices are detecting the same event. If not, the attack is localized and a policy change may be established for only the section of the network under attack. If multiple IDS functions report the same signature detection event, the network administrator quickly recognizes the source of the attack or a distributed attack pattern and can respond accordingly. In the first instance, the response may be pinpointed with minimal impact on the remainder of the network system. In the second instance, a comprehensive response may be generated more quickly, thereby reducing the likelihood of widespread harm to the network. This capability may be achieved with minimal modification to an existing network infrastructure arrangement.

The details of one or more examples related to the invention are set forth in the accompanying drawings and the description below. Other features, objects, and advantages of the invention will be apparent from the description and drawings, and from any appended claims.

DETAILED DESCRIPTION OF A PREFERRED EMBODIMENT OF THE INVENTION

Figure 1:
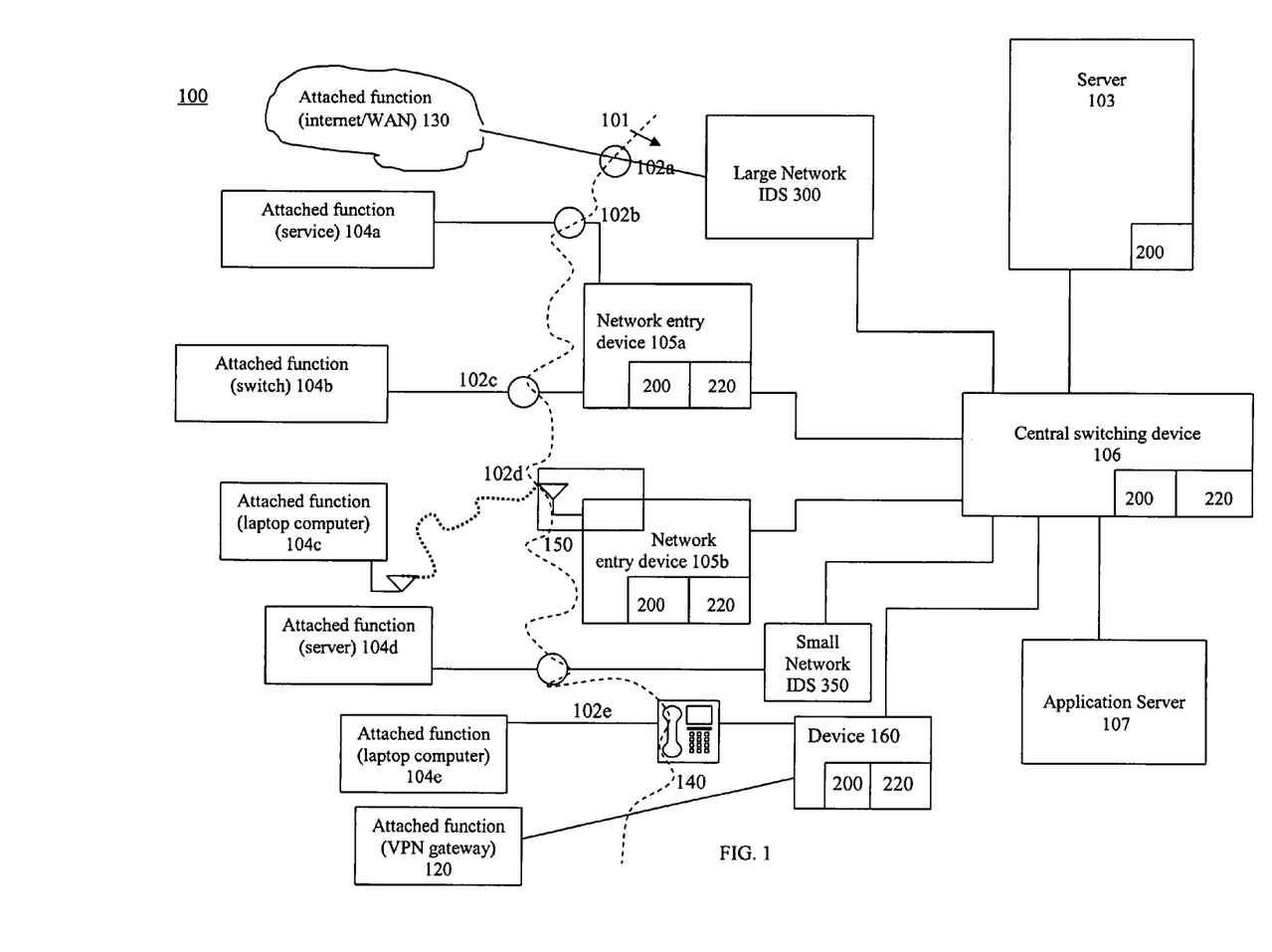
FIG. 1 is a simplified diagrammatic block representation of an example network system with the dynamic intrusion signature distribution system of the present invention.

The present invention is a system and related method for dynamic distribution of intrusion signatures to network infrastructure devices having intrusion detection and/or reporting functionality. Referring to FIG. 1, a network system 100 incorporating the capability of the distribution system of the present invention operates and provides network services to attached functions through devices of a network infrastructure 101. Network system 100 includes the network infrastructure 101 and one or more attached functions connected to or connectable to the network infrastructure 101. The network infrastructure 101 includes multiple switching devices, routing devices, firewalls, IDSs, access points, Metropolitan Area Networks (MANs), Wide Area Networks (WANs), Virtual Private Networks (VPNs), and internet connectivity interconnected to one another and connectable to the attached functions by way of connection points (e.g., 102a-e). A connection point is the physical port through which devices and/or attached functions communicate. The network infrastructure 101 includes such devices having forwarding functionality for the purpose of accessing and using network services.

One or more central forwarding devices, represented by central switching device 106, enable the interconnection of a plurality of network entry devices, such as devices 105a-b and 160, as well as access to network services, such as server 103 or an application server 107. It is to be understood that a central forwarding device, or an entry forwarding device, is not limited only to switches as that term is traditionally understood. Instead, the forwarding device may be any device capable of forwarding signals through the network infrastructure pursuant to forwarding protocols. The central switching device 106 enables the interconnection of the network infrastructure 101 to attached functions that include VPNs (represented by VPN gateway device 120) and WANs (represented by internet cloud 130) as well as Internet Protocol (IP) telephones (represented by telephone 140). It is to be understood that the IP telephone 140 may also perform as a network entry device for the purpose of connecting an attached function, such as a laptop computer, to the network infrastructure 101.

An attached function is external to infrastructure 101 and forms part of network system 100. Examples of attached functions 104a-104e are represented in FIG. 1, and may be any of the types of attached functions previously identified. Network infrastructure entry devices 105a-b, 140, and 160 of infrastructure 101 provide the means by which the attached functions connect or attach to the infrastructure 101. A network entry device can include and/or be associated with a wireless access point 150. For wireless connection of an attached function to the infrastructure 101, the wireless access point 150 can be an individual device external or internal to the network entry device 105b.

One or more devices of the network infrastructure 101 include a Network IDS (NIDS) function 200 and a Dynamic Intrusion Signatures (DIS) function 220 that is the focus of the present invention. The NIDS function 200 may be any sort of IDS function available that provides traffic monitoring, signature detection, and signature detection reporting. One example of a suitable IDS function is the Dragon® IDS available from Enterasys Networks, Inc. of Andover, Mass. The NIDS function 200 may be embodied in a dedicated appliance, such as large NIDS appliance 300 or small NIDS appliance 350. The NIDS function 200 may also be integrated into a network device that includes other functions. The NIDS function 200 may be stored or cached on a device and activated by the analysis sub-function described herein. It may also be dynamically distributed to a network infrastructure device by the analysis sub-function for discrete tasks. The DIS function 220 includes a signature distribution sub-function and a signature update sub-function. While the DIS function 220 is shown in FIG. 1 as part of entry devices 105a, 105b, and 160, as well as central switching device 106, it may be in other or fewer devices. It is to be noted that IP phone 140 may include a DIS function 220; however, that is not shown in FIG. 1.

The DIS function 220 may be established in hardware and/or software (e.g., a function embodied in an application executing on one or more devices of the network infrastructure 101). The particular network device on which the DIS function 220 resides may vary from manufacturer to manufacturer; it may include a port or set of ports, an interface or a set of interfaces. The network system 100 may include other network devices without either or both of the NIDS function 220 and the DIS function 220. There may be a combination of network entry and centralized forwarding devices having the DIS function 220 of the present invention.

Figure 2:
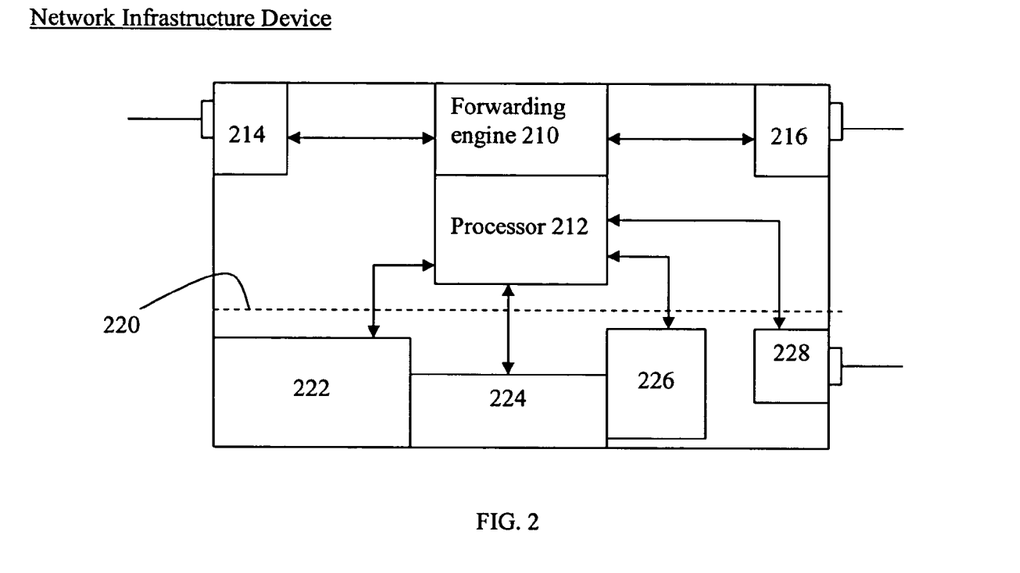
FIG. 2 is a simplified diagrammatic block representation of a network infrastructure device with forwarding function and dynamic intrusion signature distribution function of the present invention.

As illustrated in FIG. 2, the dynamic intrusion signature distribution system of the present invention includes several functions and elements. The DIS function 220 is embodied in one or more forwarding devices of the network infrastructure 101. A network device including the DIS function 220 includes a forwarding engine 210, a processor 212, an ingress port interface 214, an egress port interface 216, and a communication function 228. The DIS function 220 includes an analysis sub-function 222, a signature distribution sub-function 224, and a signature update sub-function 226. The DIS function 220 further includes a communication function 228 including means for receiving network information, such as from the IDS function 200. Further, the DIS function 220 may receive through the communication function 228 intrusion signature information from other means, such as a human operator or administrator to initiate the analysis sub-function and/or the signature update sub-function. The communication function 228 also includes means for the DIS function 220 to exchange messages with one or more network system devices and/or functions, including with the NIDS function 200 and/or other devices with the DIS function 220.

The analysis sub-function 222 performs the function of evaluating information received from the NIDS function 200 and from other network infrastructure devices having the DIS function 220. It may also evaluate other network system information as deemed to be of interest by the network administrator. If information is received from the NIDS function 200 in the form of one or more identified intrusion signatures, the analysis sub-function 222 determines that an identified intrusion signature distribution must be initiated. If the information is received from another network infrastructure device in the form of a notice of a detected intrusion signature on one or more other devices, or some other type of information that is a distribution triggering condition, the analysis sub-function 222 determines that the signature library of the NIDS function 200 with which it is associated on a particular network infrastructure device, and/or other devices including the NIDS function 200, must be updated. Under the first condition, the analysis sub-function 222 instructs the signature distribution sub-function 224 to forward the identified intrusion signature(s) to other network infrastructure devices. Under the second condition, the analysis sub-function 222 instructs the signature update sub-function 226 to forward received intrusion signature(s) information to the applicable NIDS function 200 for the updating of that function's signatures table. Instruction and information forwarding may be achieved using unicast, multicast and/or broadcast communication methods, but not limited thereto including, for example, a Layer 2 or Layer 3 multicast protocol distribution. Alternatively, the analysis sub-function 222 may dynamically distribute one or more intrusion signatures based on other triggering information. The distribution may be made independent of a determination of whether a particular library includes a particular intrusion signature. Such triggering information may include the triggering conditions described in pending U.S. patent application Ser. No. 10/629,331 entitled "SYSTEM AND METHOD FOR DYNAMIC NETWORK POLICY MANAGEMENT", assigned to a common assignee. The contents of that application are incorporated herein by reference. Any such triggering conditions may constitute distribution triggering conditions for the purpose of the present invention. The analysis sub-function 222 may also activate dormant cached or stored intrusion signatures and may establish monitoring priorities and signature monitoring rules.

In general, in a forwarding situation, the processor 212 provisions the forwarding engine 210 with the new signature information that the device has been instructed to distribute and/or to update. The network device including the DIS function 220 is configured at ingress port interface 214 to recognize and exchange signals with attached functions and other network infrastructure devices. The signals pass from the ingress port interface 214 to the forwarding engine 210 for forwarding decisions. Forwarding decisions include, but are not limited to, forwarding through egress port interface 216 received signals to other network infrastructure devices, such as an authentication server, the application server 107, and other devices, such as the central switching device 106 or large NIDS 300, for example. The forwarding engine 210 may be any type of forwarding function including, but not limited to, a Layer 2 switch or bridge or a Layer 3 router. One or more of the described interfaces, functions, forwarding engine, and processor may be discrete components, or parts of one or more common components. They may be coupled together as module components in any combination of hardware, firmware, software, microcode or any combination thereof.

The processor 212 communicates with the forwarding engine 210, the analysis sub-function 222, the distribution sub-function 224, and the update sub-function 226. If a detected intrusion signature signal is received at the ingress port interface 214 from an associated NIDS function 200, the processor 212 directs forwarding of the identified signature to other devices via the egress port interface 216. If a new intrusion signature signal is received at the ingress port interface 214 from another network infrastructure device, the processor 212 directs forwarding of the identified signature to the associated NIDS function 200 either directly if the two are integrated, or via the egress port interface 216 if they are discrete.

Access by an attached function to the network services associated with network system 100 includes an exchange of signals that are monitored by the NIDS function 200. Entry to the network system 100, and the infrastructure 101 primarily, may be initially regulated using authentication systems such as Network Operating Systems (NOSs), Remote Authentication Dial-In User Service (RADIUS), described in IETF RFC 2138, and IEEE 802.1X standard, which provides for port-based network entry control based on a MAC identifier. In the case of NOS and RADIUS, an authentication server provides the mechanism for establishing such authentication. RADIUS may also provide authorization and, optionally, accounting capability related to network usage. In the case of IEEE 802.1X, the network entry devices may be configured with such authentication capability, as described more fully in that standard. IEEE 802.1Q standard provides another means for controlling access and use of network services.

Figure 3:
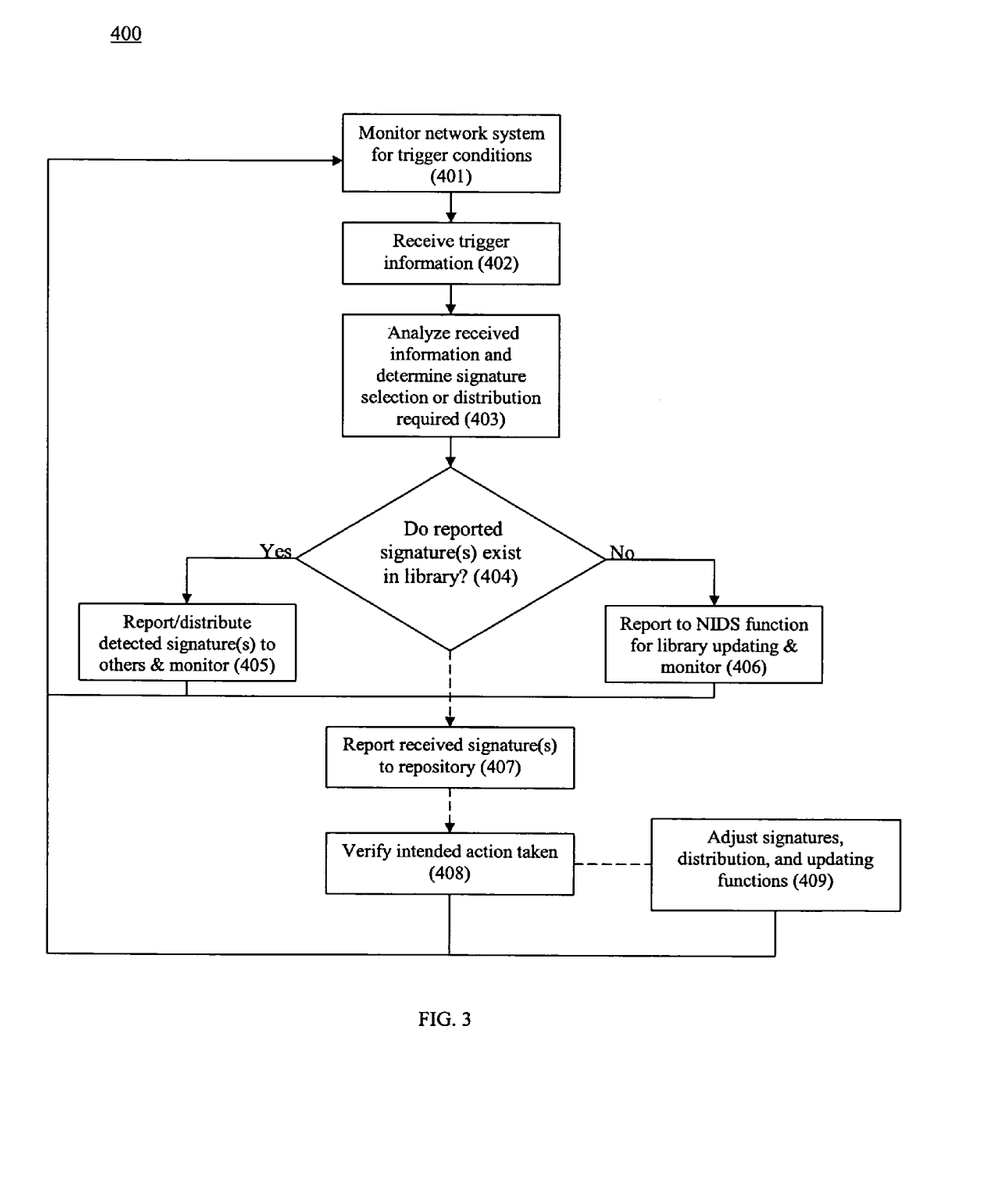
FIG. 3 is a simplified flow diagram representing the dynamic intrusion signature distribution method of the present invention.

With reference to FIG. 3, in operation, a dynamic distribution/update of intrusion signatures method 400 of the present invention preferably occurs at one or more network system devices, including devices with the DIS function 220. Functioning of the network, entry to it, and preliminary usage rules may be established in a manner consistent with current practice. Method 400 includes the steps of monitoring the network system 100 for harmful intrusion activities including identifiable intrusion signatures, or more generally, distribution triggering conditions/information (step 401), and receiving detected trigger information (step 402) either from an associated NIDs function 200, or from another network device including the DIS function 220. Method 400 also includes the step of analyzing the received information and determining whether a signature distribution or selection is to be made (step 403). Next, the method includes the step of determining whether one or more intrusion signatures are to be distributed to one or more other network devices, including to a signature library of the associated NIDS function 200 (step 404). If it is a signature to be distributed or selected, the signature is distributed to one or more other network infrastructure devices for monitoring (step 405). If it is a new signature to be monitored by the receiving device, the received signature is forwarded to the NIDS function 200 for library updating (step 406). An additional optional step of the method 400 includes reporting signature information received, distribution instructions forwarded, and/or updating information forwarded to a repository, such as policy server 103 but not limited thereto, that may be accessed as desired (step 407).

The effect of the distribution or update may be verified or evaluated by, for example, polling the one or more network infrastructure devices including the DIS function 220 to confirm that a distribution has been received and a NIDS function 200 library updated (step 408). Such verification may be of particular interest in those instances when information and/or instructions are communicated by multicast or broadcast messaging. It is to be understood that all communications among functions should preferably be secured with acceptable means to insure secure and robust communications among trusted parties. These secure communication techniques, such as encryption, are well known to those skilled in the art. Another optional step of the method 400 is to adjust signature information, information regarding distributions and/or updates based on reported information (step 409), and to report such adjustments to the repository. It is to be noted that such adjustments may be made automatically, manually, or by administrative means. The signal exchange traffic monitoring for identified intrusion signatures is preferably a continuous observation of network traffic.

The following is a list of a few possible devices (but not limited to only those devices) that can contain the NIDS function 200, the NIDS function 220, or a combination of the two: network switches, repeaters, signal or packet relay devices, data switches, routers, WAN devices, MAN devices, optical switches, firewalls, gateways, computing devices such as network file servers or dedicated usage servers, management stations, Private Exchange Branch (PBX) devices, telecommunication devices, cellular phones, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as RADIUS, Extensible Authentication Protocol/IEEE 802.1X or others. It is to be noted that the present invention is applicable to telephone as well as data communication network systems.

One means to provide the signatures information to the NIDS function 200, and/or other network infrastructure devices including the DIS function 220 is the Simple Network Management Protocol (SNMP). A network administrator provisions the signature information through the terminus of a network connection point associated with the attached function. The forwarding engine 212 reads the terminus information via the SNMP. In another example, MIB parameters may be established or used to obtain and configure the analysis sub-function 22, the distribution sub-function 224, the update sub-function 226, the NIDS function 200 signature database or any combination thereof. MIBs may also be employed to populate one or more tables of the network system device operating as network infrastructure devices with historical information for storage and/or caching.

Figure 4:
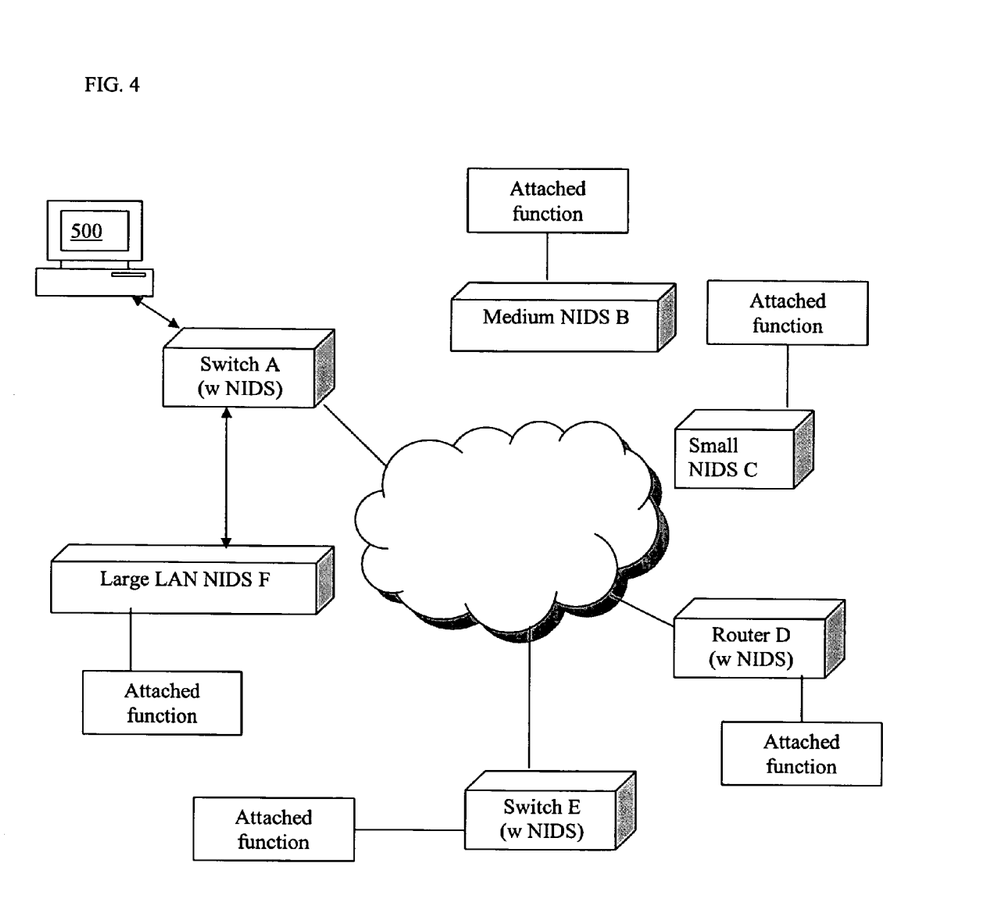
FIG. 4 is a simplified diagrammatic block representation of the example network system with the dynamic intrusion signature distribution system of the present invention, showing an attack pattern directed at a network entry infrastructure device not having the attack pattern in its signatures library and a centralized network infrastructure device with the attack pattern in its signatures library.
Figure 5:
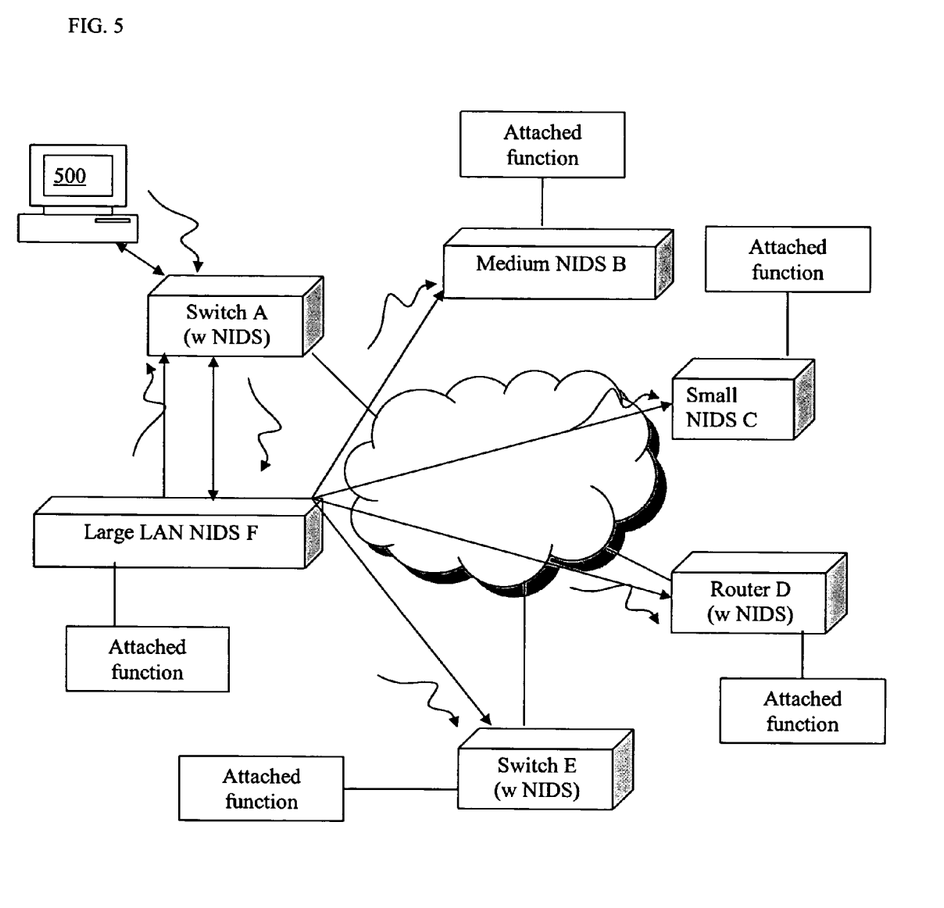
FIG. 5 is a simplified diagrammatic block representation of the example network system with the dynamic intrusion signature distribution system of the present invention, showing the centralized network infrastructure device reporting the identified attack pattern signature to all network infrastructure devices having intrusion detection functionality.
Figure 6:
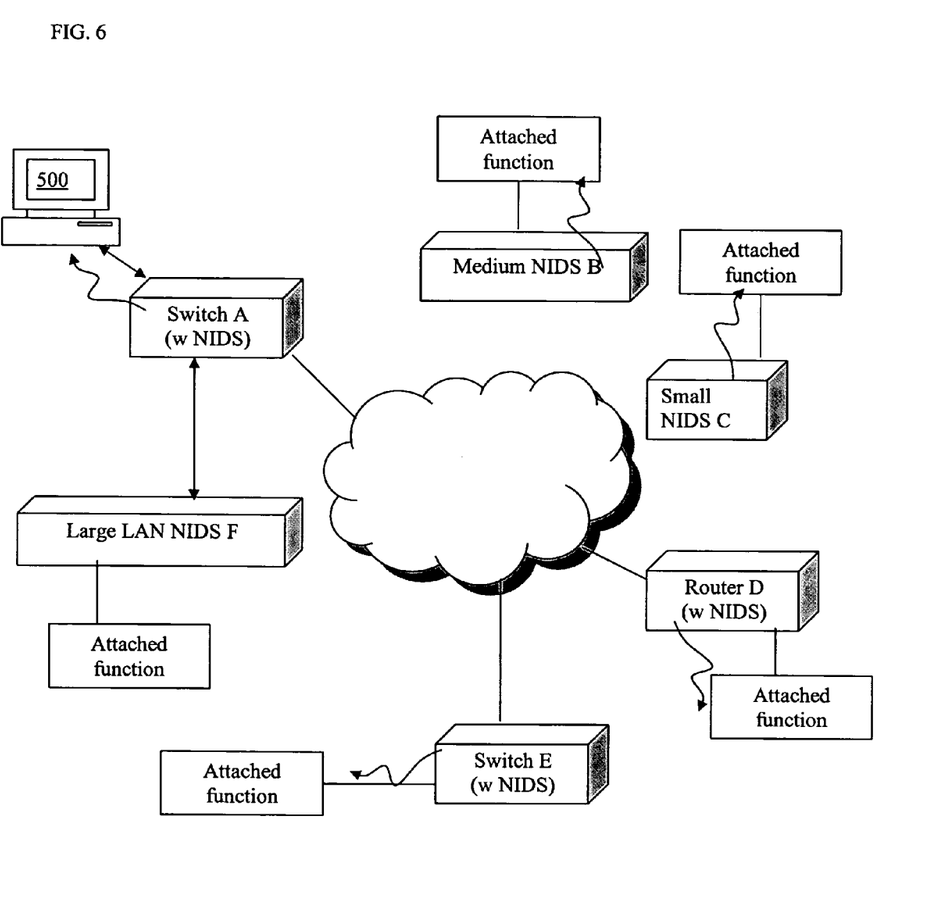
FIG. 6 is a simplified diagrammatic block representation of the example network system with the dynamic intrusion signature distribution system of the present invention, showing signature distribution among various network infrastructure devices.

The following description with reference to FIGS. 4-6 provides an example of implementing the system and method of the present invention to improve network system security. As shown in FIG. 4, each of infrastructure devices A-F shown includes some form of NIDS functionality, with switches A and E and router D having relatively small intrusion signature libraries. Devices A, D, and E include the DIS function 220 and may include the NIDS function 200. Devices B, C, and F are dedicated intrusion detection appliances, with appliances B and F having larger intrusion signature libraries, as well as more dedicated IDS operational commitment than the other devices. Appliance C represents yet another NIDS function that may be associated with a relatively small LAN and having an intrusion signatures library smaller than the sizes of the libraries for appliances B and F. In this representative network system, appliance F represents a NIDS associated with a particular Local Area Network (LAN) of the network system dedicated to intrusion detection and reporting and connected to other network infrastructure devices, including those without any intrusion detection functionality. Appliance B also represents a NIDS appliance that may be associated with another LAN or set of LANs and having an intrusion signatures library of size comparable to the library of appliance F. Appliances B, C, and F have at least one sub-function of the DIS function 220: that of reporting detected signatures to other devices, either directly or through a central server such as server 103. The intrusion signature libraries of the devices may not be the same or subsets of the libraries of other such devices.

With reference to FIG. 4, a hacker 500 may initiate an attack on the network system 100 through one of the network infrastructure devices, such as device A. For the purpose of showing the advantage of the present invention, that attack includes a signature not contained in the intrusion signatures library of device A. The attack pattern is then passed to the IDS appliance F where it is observed as a signature pattern to be reported. As illustrated in FIG. 5, the appliance F including the reporting sub-function, or some other network infrastructure device with reporting function, such as a network management server, reports to the other devices (A-E) of the network system having intrusion detection functionality the existence of the signature. The reporting NIDS or management server further directs the other devices to install the detected intrusion signature in their respective signatures libraries. As a result, all of the intrusion detection-capable devices, including device A originally attacked, of the network infrastructure have the capability to detect the pattern first detected only by device F.

As illustrated in FIG. 6, once armed with the new intrusion signature reported to it by device F, device A is able to identify the intrusion signature transmitted by the hacker 500 and can report that attack—more quickly than in the previous instance where the attack passed through that device and had to be detected by NIDS device F. Rapid identification of an attack pattern increases the likelihood of responding to it more quickly than if it must first be detected at a central point which may be a network choke point. In addition, the distribution of the identified signature to the other intrusion detection devices enables the network administrator to determine the attack source, whether the attack is localized (affecting just the portion of the network system including device A), or distributed (an attack of the same type spread to others of the network infrastructure devices). The network administrator is therefore more likely to minimize any damage to the entire network system 100 resulting from a developing, insidious attack and be able to minimize the response to the smallest effective set of devices.

As previously noted, the basic NIDS function 200 may be of the type available through the Dragon™ intrusion detection system offered by Enterasys Networks, Inc. of Andover, Mass. Further, the device configuration and reporting functions for monitoring the network infrastructure devices and effecting any policy changes thereof based on the intrusion reporting may be achieved through the Netsight™ Atlas™ network management tool offered by Enterasys Networks, Inc. of Andover, Mass. It is contemplated that the IDS function, the network management tool, or both include one or more application program interfaces for collecting the attached function and enforcement device information and for querying the directory service for response requirements.

As previously indicated, it is to be understood that the functions described herein may be implemented in hardware and/or software. For example, particular software, firmware, or microcode functions executing on the network infrastructure devices can provide the implementation function. Alternatively, or in addition, hardware modules, such as programmable arrays, can be used in the devices to provide some or all of those capabilities.

Other variations of the detailed description of the present invention may be implemented. One example variation is that the illustrated method steps may include additional steps. Further, the order of the steps illustrated as part of the process is not limited to the order illustrated in FIG. 3, as the steps may be performed in other orders, and one or more steps may be performed in series or in parallel to one or more other steps, or parts thereof. Moreover, the analysis function 222 may be implemented in one or more other devices of the network system 100.

The processes, steps thereof and examples and variations of these processes and steps, individually or in combination, associated with the system of the present invention may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of the system described above and may be distributed across one or more such components.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method for the dynamic distribution of intrusion signatures to one or more switches and/or routers of a network system, wherein the one or more switches and/or routers include an intrusion detection system library including intrusion signatures and are interconnection devices having packet forwarding functionality and wherein the network system provides network services, the method comprising the steps of:
   a. configuring at least one of the one or more switches and/or routers to monitor received network traffic for distribution triggering conditions, wherein the primary function of the configured at least one of the one or more switches and/or routers is packet forwarding;
   b. detecting and identifying one or more of the distribution triggering conditions;
   c. reporting information relating to the detection of the one or more distribution triggering conditions to a network security management module;
   d. employing an intrusion signature deployment algorithm of the at least one of the one or more configured switches to enable the automatic transmission of intrusion signature information to a portion of the one or more configured switches and/or routers;
   e. adjusting one or more priorities of at least one of the one or more configured switches and/or routers as a function of the detected triggering condition by employing the intrusion signature deployment algorithm to monitor received packets for patterns matching one or more intrusion signatures based on how recently the distribution triggering condition was detected, the severity of the potential harm to the network system, the least lost performance impact at the one or more of the one or more configured switches and/or routers, or randomness; and
   f. providing to a central repository the status of the monitoring priority adjustments made.

2. The method as claimed in claim 1 further comprising the step of verifying that the transmitted intrusion signature information has been received by at least one of the one or more switches and/or routers.

3. The method as claimed in claim 1 further comprising the steps of dynamically updating the library of those switches and/or routers determined not to have the one or more intrusion signatures to include the one or more intrusion signatures transmitted and reporting to a central repository completion of the step of dynamically updating.

4. The method as claimed in claim 1 wherein the step of automatically transmitting are performed by a central device of the network system.

5. The method as claimed in claim 3 further comprising the step of continuing to monitor the network system for the same or additional distribution triggering conditions after dynamically updating the one or more of the one or more switches and/or routers not having the one or more intrusion signatures after performing the step of employing.

6. A switch of a network system, wherein the network system provides network services, the switch comprising:
   a. an intrusion detection system library including intrusion signatures;
   b. an intrusion detection function for monitoring network traffic packets received at the switch for distribution triggering conditions, wherein the primary function of the switch is packet forwarding;
   c. an intrusion signature deployment algorithm to enable the switch to: i) receive from one or more other devices of the network system one or more intrusion signatures and update the library with the one or more received intrusion signatures upon determination that the one or more received intrusion signatures do not exist therein; and ii) transmit to one or more other switches and/or routers of the network system one or more intrusion signatures which may include the one or more received intrusion signatures;
   d. a reporting function to enable the switch to: i) report to a network security management module information relating to the detection of one or more of the distribution triggering conditions; and ii) providing to a central repository the status of monitoring priority adjustments made by the switch in monitoring received packets based on how recently the distribution triggering condition was detected, the severity of the potential harm to the network system, least lost performance impact at the switch, or randomness.

7. The method as claimed in claim 1 wherein the step of adjusting priorities involves selecting at least one of the one or more switches and/or routers to receive one or more designated intrusion signatures.

8. The method as claimed in claim 1 further comprising the step of distributing to the one or more switches and/or routers receiving the transmitted intrusion signature information an intrusion detection function.

9. The method as claimed in claim 1 wherein the step of monitoring is performed by an IDS function including a library of intrusion signatures and the step of monitoring includes the step of automatically updating by the IDS function the library of intrusion signature information for the one or more switches and/or routers.

10. A method for detecting triggering conditions that may affect the security of a network system including a plurality of network devices, the method comprising the steps of:
   a. executing a distribution function on one or more servers of the network system to distribute automatically through, and directly by, the one or more servers of the network system an intrusion detection function to one or more of a plurality of switches and/or routers upon detection of one or more distribution triggering conditions, wherein the one or more of the plurality of switches and/or routers are arranged to execute the intrusion detection function while maintaining as a primary function the function of forwarding packets;
   b. reporting information relating to the detection of the one or more distribution triggering conditions to a network security management module;
   c. adjusting one or more priorities in the monitoring of received packets for patterns matching one or more intrusion signatures based on how recently the distribution triggering condition was detected, the severity of the potential harm to the network system, performance impact at the one or more of the one or more switches and/or routers, or randomness; and
   d. providing to a central repository the status of the monitoring priority adjustments made.

11. The method as claimed in claim 10 wherein the step of executing the distribution function includes distributing the intrusion detection function to one or more of the plurality of switches and/or routers with no intrusion detection capability or activating the intrusion detection function stored or cached on one or more of the plurality of switches and/or routers.

12. The method as claimed in claim 10 wherein the distribution triggering condition is selected from the group consisting of detection of one or more known intrusion signatures, a time period, a data frequency, and a manual input.

13. A method for protecting a network system including one or more switches and/or routers, network services and one or more servers, the method comprising carrying out in one or more of the one or more switches and/or routers the steps of:
   a. configuring at least one of the one or more switches and/or routers with an intrusion signature deployment algorithm to receive one or more reported intrusion signatures from one or more other devices of the network system, wherein the primary function of the configured at least one of the one or more switches and/or routers is packet forwarding;
   b. determining whether received reported intrusion signatures exist in a library of an intrusion detection system, including intrusion signatures, of the at least one of the one or more configured switches and/or routers receiving the notification;
   c. updating the libraries of the at least one of the one or more configured switches and/or routers receiving the one or more reported intrusion signatures upon determination that the received reported intrusion signatures do not exist therein;
   d. configuring the at least one of the one or more configured switches and/or routers to monitor network traffic for distribution triggering conditions;
   e. detecting and identifying one or more distribution triggering conditions;
   f. reporting information relating to the detection of the one or more distribution triggering conditions to a network security management module;
   g. adjusting one or more priorities of at least one of the more or more configured switches and/or routers by employing the intrusion signature deployment algorithm to monitor received packets for patterns matching one or more intrusion signatures based on how recently the distribution triggering condition was detected, the severity of the potential harm to the network system, least lost performance impact at the one or more of the one or more configured switches and/or routers, or randomness; and
   h. providing to a central repository the status of the monitoring priority adjustments made.

14. The method as claimed in claim 13 wherein the step of receiving the reported one or more intrusion signatures includes receiving the reported one or more intrusion signatures from the one or more servers of the network system.

15. The method as claimed in claim 13 wherein intrusion signatures are stored in a plurality of devices of the network system and the library of one or more of the one or more of the switches and/or routers receiving the notification does not contain all intrusion signatures stored in the network system.

16. The method as claimed in claim 15 further comprising the step of configuring the one or more switches and/or routers receiving the notification to monitor for a portion of the intrusion signatures of its library.

17. The method as claimed in claim 16 further comprising the step of selecting the portion of the intrusion signatures to be monitored by the one or more switches and/or routers based on a weighting established for the distribution triggering condition detected.

18. The method as claimed in claim 13 further comprising the step of configuring the one or more switches and/or routers to only monitor for the intrusion signatures without interfering in the primary function of forwarding packets.

19. The method as claimed in claim 18 further comprising the step of selecting a portion of the intrusion signatures to be monitored by the switches and/or routers based on a weighting established for the distribution triggering condition detected.

20. The method as claimed in claim 13 wherein the step of updating the library includes the step of replacing one or more intrusion signatures existing in the library.

21. The method as claimed in claim 20 wherein the step of replacing includes the step of determining which of the one or more intrusion signatures to replace based on weighting established for the distribution triggering condition detected or local criteria.

22. The method as claimed in claim 21 wherein the local criteria includes age of the intrusion signatures contained in the library and physical location or logical location of the one or more switches and/or routers.

23. The switch as claimed in claim 6 configured to monitor received packets for pattern matching based on one or more intrusion signatures contained in its updated library.

24. The switch as claimed in claim 23 wherein the switch is further configured to only monitor the received packets for pattern matching without interfering in the primary function of forwarding packets.

25. The switch as claimed in claim 24 wherein the switch is further configured to receive from one or more servers of the network system a portion of the intrusion signatures to be used in the monitoring of the received packets based on a weighting established for a distribution triggering condition detected by the one or more servers, wherein the one or more servers are not interconnection devices with packet forwarding functionality.

26. The switch as claimed in claim 6 wherein the intrusion signature deployment algorithm updates the library by replacing one or more intrusion signatures existing in the library.

27. The switch as claimed in claim 26 wherein the intrusion signature deployment algorithm replaces the one or more intrusion signatures by determining which of the one or more intrusion signatures to replace based on weighting established by one or more servers of the network system for a distribution triggering condition detected by the one or more servers, wherein the one or more servers are not interconnection devices with packet forwarding functionality.

28. The switch as claimed in claim 27 wherein the weighting is established by the one or more servers as a function of one or more of age of the intrusion signatures contained in the library and physical location or logical location of the switch.

29. The method as claimed in claim 1 wherein the one or more switches and/or routers selected for receiving the transmitted intrusion signature information are selected as a function of the physical location or logical location of the one or more switches and/or routers.

30. The switch as claimed in claim 6 wherein the intrusion signature deployment algorithm updates the library of the switch based on the switch's physical or logical location in the network system.

31. The method as claimed in claim 10 further comprising the steps of:
  a. establishing as part of the intrusion detection function in each of the one or more of the plurality of switches and/or routers a library including intrusion signatures;
  b. transmitting from the one or more servers to the one or more of the plurality of switches and/or routers intrusion signature information, wherein those one or more switches and/or routers selected for receiving the transmitted intrusion signature information are selected at least as a function of one or more distribution triggering conditions detected;
  c. configuring at least one of the one or more of the plurality of switches and/or routers to monitor received packets for pattern matching based on the received intrusion signature information contained in its library and to report detected intrusion signatures regardless of network service that may be the subject of a harmful network intrusion.

32. The method as claimed in claim 31 further comprising the step of dynamically updating the libraries of the one or more switches and/or routers determined not to have one or more intrusion signatures transmitted from the one or more servers.

33. The method as claimed in claim 31 wherein the one or more switches and/or routers receiving the transmitted intrusion signature information are selected as a function of the physical location or logical location of the one or more switches and/or routers.

34. The method as claimed in claim 13 wherein the updating step further includes the step of making a determination whether to update the library of any one or more of the one or more switches and/or routers based on the physical location or logical location of the one or more switches and/or routers.

35. The method as claimed in claim 1 wherein the step of adjusting priorities involves selecting within one or more of the switches and/or routers one or more intrusion signatures of the libraries thereof to be monitored.

36. The method as claimed in claim 1 wherein the step of adjusting priorities involves selecting at least one of the one or more switches and/or routers to conduct monitoring for one or more intrusion signatures.

37. The method as claimed in claim 13 wherein the step of adjusting priorities involves selecting at least one of the one or more switches and/or routers to receive one or more designated intrusion signatures.

38. The method as claimed in claim 13 wherein the step of adjusting priorities involves selecting within one or more of the switches and/or routers one or more intrusion signatures of the libraries thereof to be monitored.

39. The method as claimed in claim 13 wherein the step of adjusting priorities involves selecting at least one of the one or more switches and/or routers to conduct monitoring for one or more intrusion signatures.

40. The method as claimed in claim 1 wherein the step of adjusting priorities includes the step of prioritizing the functionality of the at least one of the one or more switches and/or routers configured to monitor received packets for pattern matching based on one or more intrusion signatures before performing one or more other functions.

41. The method as claimed in claim 7 wherein the step of adjusting priorities includes the step of prioritizing the functionality of the selected one or more switches and/or routers configured to monitor received packets for one or more intrusion signatures before performing one or more other functions.

42. The method as claimed in claim 13 wherein the step of adjusting priorities includes the step of prioritizing the functionality of the at least one of the one or more switches and/or routers configured to monitor received packets for pattern matching based on one or more intrusion signatures before performing one or more other functions.

43. The method as claimed in claim 37 wherein the step of adjusting priorities includes the step of prioritizing the functionality of the selected one or more switches and/or routers configured to monitor received packets for one or more intrusion signatures before performing one or more other functions.

44. The switch as claimed in claim 6 wherein the adjusting of one or more priorities includes selecting one or more intrusion signatures of the library in the monitoring of the received packets.

* * * * *